Sept. 6, 1955　　　　　　L. D. FITLER　　　　　　2,716,818
WIRE CUT-OFF CONTROL
Filed Oct. 17, 1952　　　　　　　　　　　　3 Sheets-Sheet 1
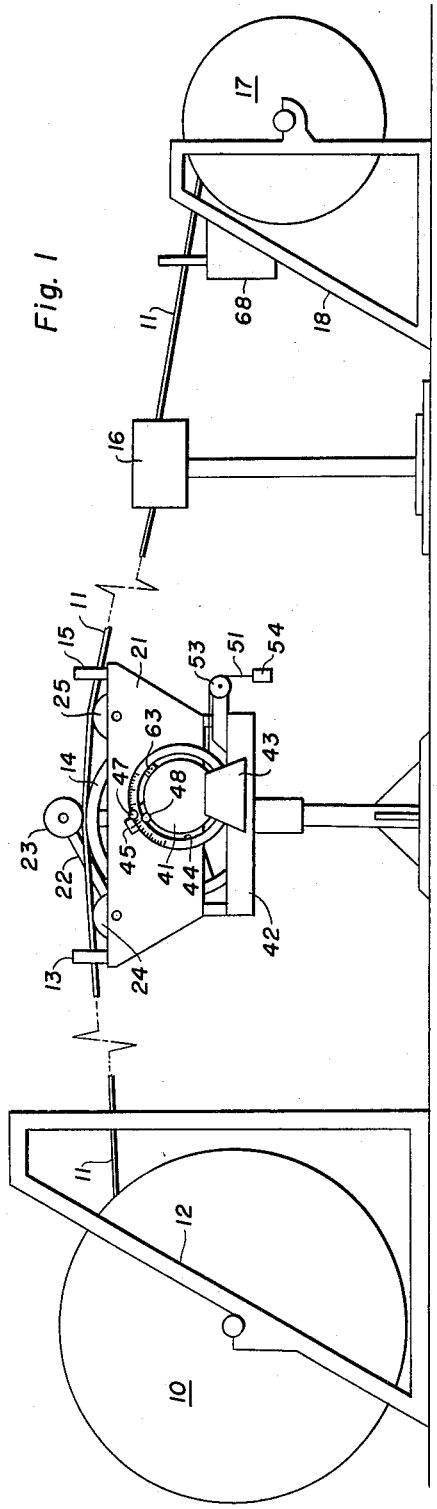
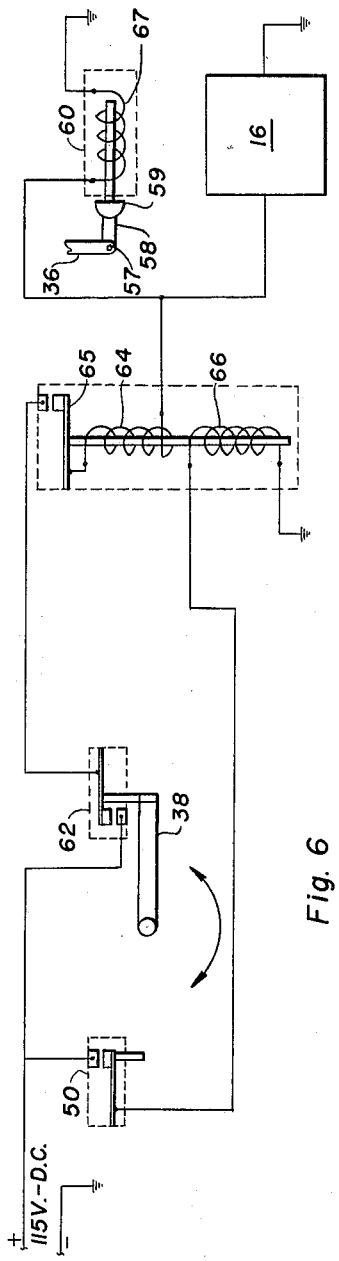
*INVENTOR.*
Lester D. Fitler
BY
Hoag, Kilburn & Carlson
*ATTORNEYS.*

Sept. 6, 1955     L. D. FITLER     2,716,818

WIRE CUT-OFF CONTROL

Filed Oct. 17, 1952     3 Sheets-Sheet 2

INVENTOR.
Lester D. Fitler
BY
Hoag, Kilburn & Carlson
ATTORNEYS.

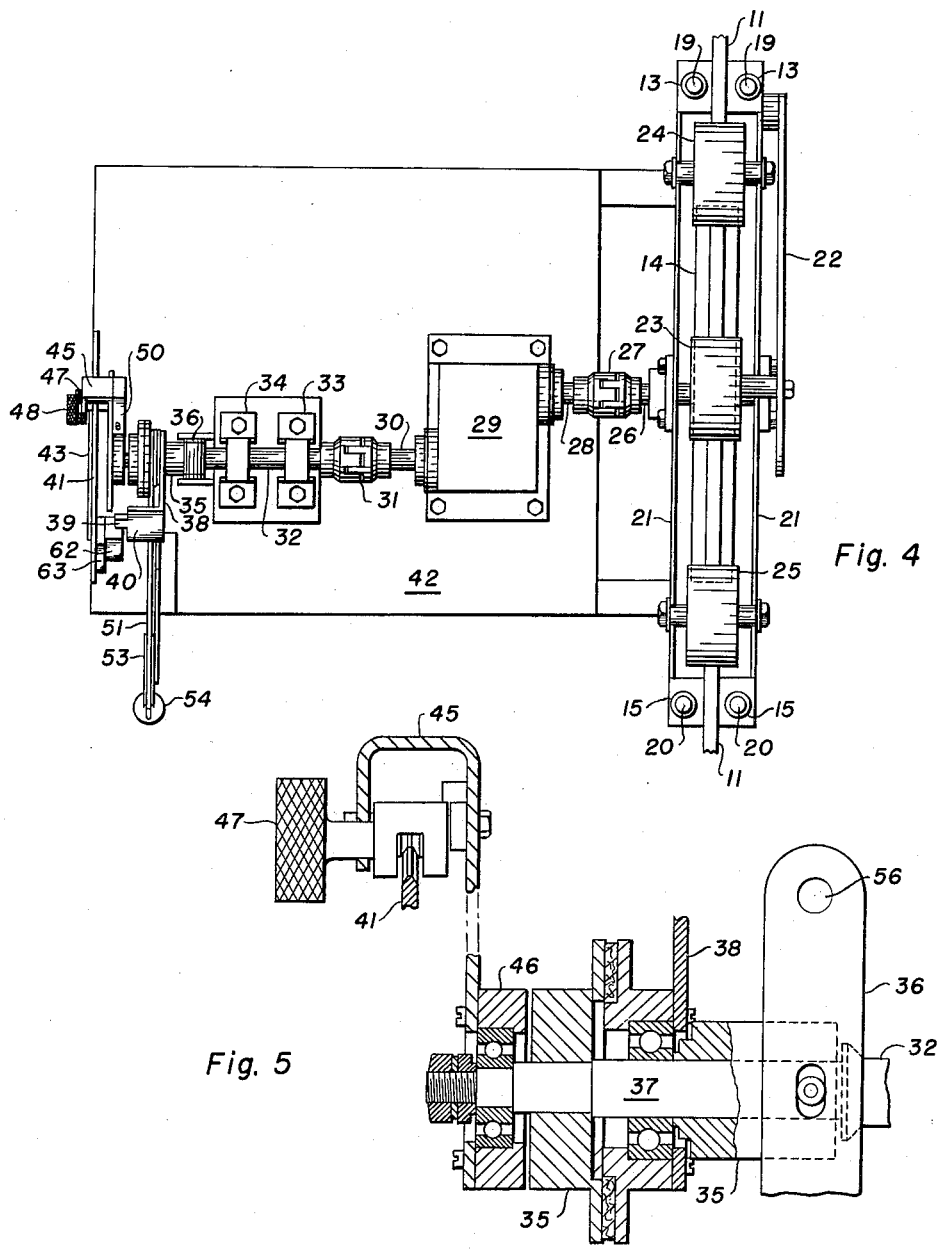

United States Patent Office 2,716,818
Patented Sept. 6, 1955

2,716,818

WIRE CUT-OFF CONTROL

Lester D. Fitler, Rome, N. Y., assignor to Rome Cable Corporation, Rome, N. Y., a corporation of New York Application October 17, 1952, Serial No. 315,251

5 Claims. (Cl. 33—131)

The present invention relates to the art of continuously winding a measured length of cable, wire or filament on a reel, spool or drum for transportation to its place of use.

More particularly the present invention relates to apparatus to measure accurately the length of cable, wire or filament wound on a receiving reel, spool or drum, to cut off said cable, wire or filament when a predetermined length has been so wound on the receiving reel, spool or drum and to continue said winding on a second receiving reel, spool or drum without interrupting the continuity of the operation.

Even more particularly the present invention relates to apparatus which when set for the winding of a particular length of cable, wire or filament not only insures that substantially that exact length will be wound on a receiving reel, but also permits by a change in the setting of the apparatus a change in said predetermined length of cable, wire or filament during and without interrupting said winding operation and without preventing the placing in position and winding upon a second receiving reel, spool or drum when said newly predetermined length of cable, wire or filament has been wound upon said first receiving reel, spool or drum.

It is thus an object of the present invention to provide apparatus which will wind cable, wire or filament of a predetermined length on a receiving reel, spool or drum within accurate limits, cut said cable, wire or filament off when said predetermined length has been so wound, actuate mechanism for shifting the winding to another receiving reel, spool or drum and continue said winding on said other receiving reel, spool or drum until said predetermined length of cable, wire or filament is wound thereupon and so on as long as desired.

It is a further object of the present invention to provide apparatus for winding a predetermined length of cable, wire or filament on a receiving reel, spool or drum and when said predetermined length is so wound, to continue said winding on a second receiving reel, spool or drum for said predetermined length without interruption in which during said winding operation and without cessation thereof adjustments may be made to said apparatus to change said predetermined length of cable, wire or filament to be wound on said receiving reel, spool or drum to a new predetermined length without interrupting said continuous winding operation.

Further objects and advantages of the present invention will be obvious from a description of the apparatus taken together with the drawing and claims appended hereto.

In the drawing:

Fig. 1 is schematic showing of an installation of the complete apparatus together with supply drum, cutting device, receiving reel, spool or drum and shifting mechanism to permit winding upon a new receiving reel, spool or drum;

Fig. 4 is a top view of said apparatus;

Fig. 5 is an enlarged section of a portion of the apparatus of Fig. 3 on line 5—5; and Fig. 6 is a wiring diagram of the electrical circuit for the operation of said apparatus.

Figure 2:
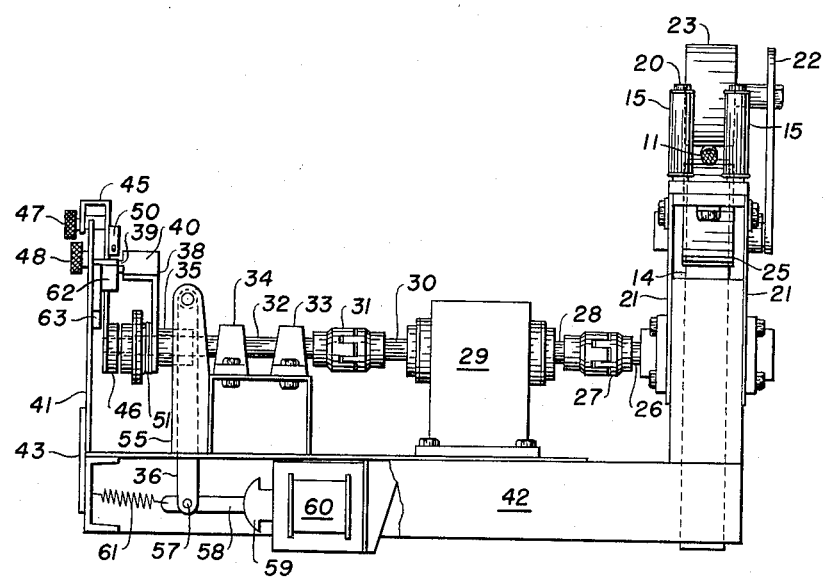
Fig. 2 is an end elevation of the length measuring and wire cut-off control apparatus of the present invention looking in the direction of the supply drum as arranged in Fig. 1.

The apparatus described and claimed is of practical use for the winding of any flexible elongated material and although primarily designed for use with multi-conductor insulated and sheathed electric cable, it is to be understood that its application is not so limited, but that it is of equally valuable use for multi-strand and single strand metallic wire of all sizes and of cross-sections small enough to be properly classified as filaments. Further, it is applicable to winding lengths of material other than metallic wires including rope, twine, tape, thread and continuous synthetic fiber filaments. In view of the above, it is to be understood that the use of the term "cable" or "wire" herein and in the claims appended hereto is intended by way of illustration and not by way of limitation and thus is meant to include all of the articles mentioned above and others of like nature. Similarly, the object upon which such article is wound is hereinafter referred to as a reel, but it is to be understood that it may take any form particularly suitable for the article to be wound upon it.

In general the apparatus comprises a counter wheel interposed between the supply drum and receiving reel which is rotated by frictional contact with the wire to be wound in predetermined lengths. This counter wheel turns a shaft which through speed reducing gears and a clutch controlled by a solenoid operated mechanism rotates a switch actuating arm toward a micro-switch contact on an indicator arm adjustably positioned to give the desired predetermined length of wound wire. When this micro-switch is closed, an electric circuit is established to put the wire cutting mechanism into operation to cut the wire. Upon the establishment of the circuit, the switch actuating arm falls back to its original position by the action of a weight or spring and then starts to rotate again for measuring and cutting off the next length of wire. A solenoid controlling the clutch is de-energized until the moment of the operation of the wire cutting mechanism. This solenoid remains energized by means of a holding circuit relay until the clutch is released and the switch actuating arm returns to its original position as above described when a contact made by that arm opens a normally closed circuit which in turn opens the holding circuit relay and de-energizes the solenoid. An additional solenoid operated circuit is connected to said microswitch for operating a device for shifting to a new receiving reel when said wire is cut after its predetermined length has been wound on the receiving reel originally in winding position.

More specifically referring to Fig. 1, 10 is a supply drum or other source of wire 11 which, as shown, is rotatably mounted on framework 12. Wire 11 passes between wire guides 13, 13 over and in frictional contact with counter wheel 14 and then between wire guides 15, 15 through wire cutting mechanism 16 to receiving reel 17 which is suitably rotatably mounted on framework 18. Wire guides 13, 13 and 15, 15 are rotatably mounted on shafts 19, 19 and 20, 20 respectively which are mounted in any suitable manner on frame plates 21, 21 on one of which is also pivotally mounted bar 22 carrying dancer wheel 23 positioned to be in contact with wire 11 opposite counter wheel 14 and thus to aid in maintaining frictional contact between wire 11 and counter wheel 14. Dancer wheel 23 is free to rotate on its axis and is so rotated by wire 11.

There are also mounted between frame plates 21, 21 idler wheels 24 and 25 which rotate with the passage of wire 11 over them and thus also aid to keep it in contact with counter wheel 14 to prevent slippage.

Referring to Figs. 2 and 4, counter wheel 14 is mounted and keyed on shaft 26 which through coupling 27 and shaft 28 is connected to speed reduction gear 29 which is of relatively very high ratio. Shaft 30 extends from the low speed gear of reduction gear 29 and is connected by coupling 31 to shaft 32. Shaft 32 is supported by suitable bearings 33 and 34 and has keyed to it at its end one plate of clutch 35 which as will be more fully described later is actuated by clutch shifting lever 36. When clutch 35 is engaged, shaft 37 having keyed to it the other plate of clutch 35 rotates with shaft 32. Mounted on the other end of shaft 37 and keyed thereto is switch actuating arm 38 on which is mounted switch actuator 39 (see Fig. 3). Switch actuating arm 38 is L-shaped having a bent over portion 40 on which switch actuator 39 is mounted.

Disk 41 is mounted on framework 42 by plate 43 or in any other suitable manner. Disk 41 (see particularly Fig. 3) is provided with an annular groove 44 extending throughout most of its circumference and located relatively close to its outer edge. Adjustable arm 45 is rotatably mounted on bearing 46 for shaft 37 and is provided with set screws 47 and 48 for firmly securing it in its adjusted position to disk 41. Set screws 47 and 48 are positioned respectively at the edge of disk 41 and of annular groove 44. Adjustable arm 45 may be rotated by adjusting knob 47 when set screw 48 is loosened and is firmly held in position when 48 is tightened. Disk 41 is provided with a scale 49 to aid the operator in the proper positioning of adustable arm 45. Adjustable arm 45 carries a micro-switch 50 (see Fig. 3) which is actuated by switch actuator 39 when actuator arm 38 rotates from its starting position into contact with adjustable arm 45. The length of the arc switch actuating arm 38 travels thus determines the length of wire 11 to be wound.

Figure 3:
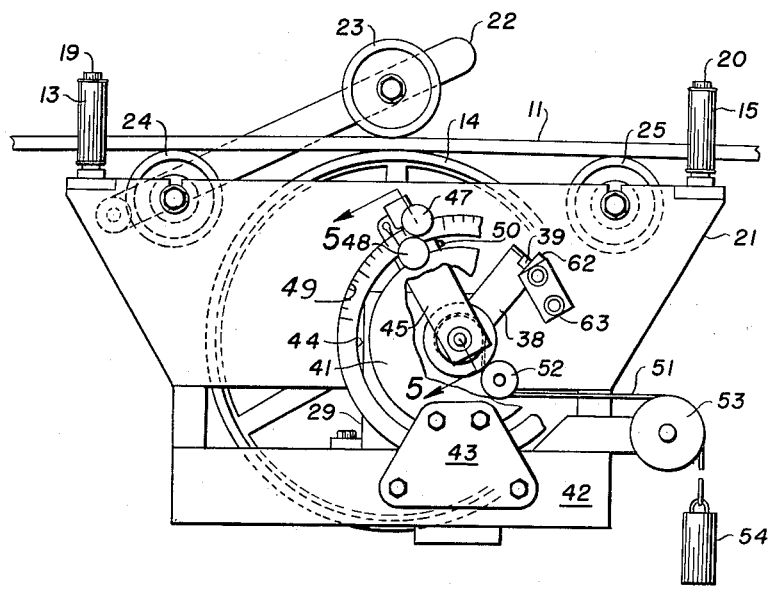
Fig. 3 is a front elevation of the apparatus of Fig. 2 partly in section.

As is shown particularly in Figs. 3 and 4, rope or wire 51 is attached at one end and wound for part of its length on the portion of clutch 35 keyed to shaft 37 to which switch actuating arm 38 is keyed and it passes over pulleys 52 and 53. At the other end of rope or wire 51 there is attached a weight 54.

Clutch 35 as may be seen most readily in Figs. 2 and 5 operates to throw shafts 32 and 37 into and out of engagement and is operated by clutch shifting lever 36 pivotally mounted on framework 55 at 56 and pivotally connected at 57 to extension 58 of plunger 59 of solenoid 60. Clutch shifting lever 36 is attached to framework 42 by tension coil spring 61 in any suitable manner so that it returns to a predetermined position when solenoid 60 is de-energized.

The electrical circuit for the operation of the apparatus is shown in Fig. 6. The current used may, for example, be 110 volt, A. C. Micro-switch 50 mounted on adjustable arm 45 is connected to an energy source and is normally open. It is closed, however, by switch actuator 39 when switch actuator arm 38 travels from its original position to a position where switch actuator 39 contacts micro-switch 50. Micro-switch 62 mounted on block 63 fixed on disk 41 at the original or zero position of switch actuating arm 38 is open, but as soon as switch actuator 39 leaves micro-switch 62 this switch closes. The closing of switch 50 energizes actuating coil 66 and closes contact 65. This allows current to flow in two branches, one through wire cutting mechanism 16 and one through coil 67 of solenoid 60 and also energizes holding coil 64. The flow of current through wire cutting mechanism 16 operates that mechanism to cut off wire 11 after the predetermined length has been wound on receiving reel 17. Energization of solenoid 60 disengages clutch 35 and stops further rotation of shaft 37 in its driven direction. Since switch actuating arm 38 mounted on shaft 37 is now free to rotate, it releases micro-switch 50 and it is brought back by the operation of weight 54 to its zero position which is against block 63 whereupon normally closed micro-switch 62 is opened. The opening of micro-switch 62 de-energizes holding coil 64 which opens contact 65 thus de-energizing coil 67 of solenoid 60 and the operating mechanism of wire cutting mechanism 16. With coil 67 de-energized, spring 61 pulls clutch shifting lever 36 back and causes clutch 35 to engage shafts 32 and 37. In the meantime, by a third circuit (not shown) closed by micro-switch 50, reel shifting mechanism is energized and places wire 11 and a new reel in proper position to start winding thereon instead of on original receiving reel 17. Since clutch 35 engages shafts 32 and 37, the apparatus is now in position to start operation and to measure a new length of wire 11 of the same length as that already wound and this action will continue for as many lengths of wire 11 as may be desired or as are fed from supply drum 19.

After the apparatus is in operation, the length of wire 11 to be wound on receiving reel 17 may readily be changed by loosening thumb screw 48 and moving adjustable arm 45 by means of adjusting knob 47 to the proper angular position on disk 41 as indicated by scale 49 without in any way disrupting the continuous winding of wire 11. It is obvious that the only limitation to the change of desired length of wire to be wound is that the new setting of adjustable arm 45 must be made before the new desired length has passed through the apparatus.

Scale 49 is calibrated in accordance with the diameter of counter wheel 14 and the ratio of reduction gear 29. It is often desirable for different applications to use reduction gears of different ratios. When reduction gear 29 is replaced by another of a different ratio, scale 49 must be replaced by another scale properly calibrated for the new reduction gear ratio.

What is claimed is:

1. In apparatus for controlling the length of wire to be wound upon a receiving reel, a rotatable shaft, a wheel fixed on said shaft having its periphery in frictional engagement with said wire as it travels through said apparatus, said wheel and shaft being driven thereby, gear reduction means for translating the rotational movement of said shaft in a reduced ratio to a second shaft, a third shaft and a clutch adapted to engage and disengage said second shaft from and to said third shaft, an arm adapted to be angularly adjusted around said third shaft, but not rotatable therewith, circuit closing means carried by said arm, a second arm fixed upon said third shaft and adapted to rotate therewith, circuit closing means on said second arm, relay operated means for operating a wire cutting mechanism energized by the contact of said circuit closing means on said first arm and on said second arm, second relay operated means for shifting said clutch to disengage said second shaft and said third shaft energized by the contact of said circuit closing means on said first and on said second arm, means for returning said second arm to its original position operative when said clutch disengages said second shaft from said third shaft, circuit breaking means on said second arm cooperating with similar means positioned at the original position of said second arm to break an electric circuit which when closed holds a contact closed permitting the energizing of said relay operating said clutch shifting mechanism and adapted to be broken when said above mentioned circuit breaking means operate and mechanical means for returning said clutch to a position where said second shaft is engaged to said third shaft.

2. A dial plate, an arm movable relative to said dial plate, a first micro-switch, a second micro-switch, means including said dial plate and said arm for adjustably spacing said micro-switches, a contact arm movable between said switches, means actuated by a travelling cable, wire, or filamentary article to measure the length of said article passing said means and to move said contact arm from said second micro-switch to said first micro-switch in synchronism with said measuring means, cut-off means for severing said article and an electric circuit for operating said cut-off means actuated when said contact arm contacts and closes said first micro-switch, clutch means between said means actuated by said travelling article and said contact arm, a second electric circuit actuated by the closing of said first switch to shift said clutch, means operable upon the shifting of said clutch to return said contact arm from contact with said first micro-switch to contact with said second micro-switch and a third electric circuit actuated by the closing of said second micro-switch to open said second electric circuit, and means for returning said clutch means to its original position upon opening of said second circuit thus causing said contact arm again to be moved toward said first switch in synchronism with said means actuated by said travelling article.

3. A control for mechanism for cutting a travelling cable, wire or filament into desired lengths which comprises, a switch actuator arm, movable between a first fixed switch and a second switch the position of which is adjustable to provide a range of movement of said arm proportional to the desired wire length, means actuated by said moving wire for rotating said arm from said fixed switch to said adjustably positioned switch, cut off means for severing said wire, an electric circuit for operating said cut off means actuated when said arm contacts said adjustably positioned switch, and means operable upon the closing of said adjustably positioned switch to return said arm into contact with said fixed switch thus reinitiating movement of said arm to measure another length, said last mentioned means including clutch means between the means actuated by the moving wire and said arm, a second electric circuit actuated by the closing of said adjustably positioned switch to shift said clutch means to open it, means acting when said second circuit is open to return said clutch to its closed position, and a third electric circuit actuated by the closing of said fixed switch to open said second circuit.

4. In apparatus for cutting a travelling wire, cable or filament into predetermined lengths, in combination, a first switch member, a second switch member spaced from said first switch member a distance proportional to the desired length to be cut from the travelling article, a switch actuator arm mounted for movement between said switch members, means actuated by a travelling cable, wire or filament to measure the length of the travelling article passing said means and to move said switch actuator arm from one of said switch members to the other, cut off means for severing said article, an electric circuit for operating said cut off means actuated when said switch actuator arm moves from contact with said first switch member into contact with said second switch member, clutch means between said means actuated by the travelling article and said switch actuator arm, a second electric circuit actuated by the closing of said second switch member to open said clutch, means operable upon the opening of said clutch to return said switch actuator arm from contact with said second switch member to contact with said first switch member, a third electric circuit actuated by the contact of said arm with said first switch member to open said second electric circuit, and means acting when said second circuit is opened to close said clutch thus causing said switch actuator arm again to be moved toward said second switch member in synchronism with said means actuated by said travelling article.

5. In a machine for measuring when a predetermined length of cable, wire or filament has travelled past a measuring station, a wheel rotatably mounted at the measuring station, means for maintaining a continuously advancing length of material to be measured in frictional contact with said wheel to rotate said wheel, a pair of switch members, one of which is fixed and the other of which is adjustable in position toward or away from the fixed switch member, set apart at a distance proportional to the said desired predetermined length, a switch actuator arm movable between said switches, a two-part clutch member, means rotatable with one of said clutch members to reciprocate said switch actuator arm between said switches, drive means interconnected between the other of said clutch parts and said wheel, an electrical circuit actuated by the contact of said arm with said adjustable switch, upon completion of movement of said arm from said fixed switch in timed relation to the movement of the travelling article, to open said clutch, means operable upon the opening of said clutch to return said switch actuator arm from said adjustable switch member to contact with said fixed switch member, another electric circuit actuated by the contact of said arm with said fixed switch member to open said first mentioned electric circuit, and means acting when said first mentioned electric circuit is opened to close said clutch, the opening of said clutch substantially coinciding with the passing of the end of a measured length past said measuring station, and the closing of said clutch substantially coinciding with the passing by said measuring station of the leading end of another length of said travelling article.

References Cited in the file of this patent
UNITED STATES PATENTS

| | | |
|---|---|---|
| 2,110,716 | Rhea | Mar. 8, 1938 |
| 2,118,944 | Purdy | May 31, 1938 |
| 2,171,667 | Michelson et al. | Sept. 5, 1939 |
| 2,339,194 | Reichelt | Jan. 11, 1944 |
| 2,642,663 | Long | June 23, 1953 |